United States Patent [19]

Liao

[11] Patent Number: 5,675,525
[45] Date of Patent: Oct. 7, 1997

[54] APPARATUS FOR PREVENTING LATCH UP OF TWO SYSTEMS WHICH ARE CONNECTED ELECTRICALLY TO EACH OTHER AND WHICH HAVE A RESPECTIVE INDEPENDENT POWER SUPPLY

[75] Inventor: Shun-Yung Liao, Taipei, Taiwan

[73] Assignee: Inventec Corporation, Taipei, Taiwan

[21] Appl. No.: 543,416

[22] Filed: Oct. 16, 1995

[51] Int. Cl.$^6$ ................................................. G06F 1/00
[52] U.S. Cl. ....................................................... 364/707
[58] Field of Search ............................ 364/707; 395/750

[56] References Cited

U.S. PATENT DOCUMENTS

| | | | |
|---|---|---|---|
| 4,485,439 | 11/1984 | Rothstein | 364/200 |
| 5,157,769 | 10/1992 | Eppley et al. | 395/200 |
| 5,428,798 | 6/1995 | Sekine et al. | 395/750 |
| 5,475,271 | 12/1995 | Shibasaki et al. | 364/707 X |
| 5,555,421 | 9/1996 | Enzinna | 395/750 |

Primary Examiner—Tan V. Mai
Attorney, Agent, or Firm—Ladas & Parry

[57] ABSTRACT

A method for preventing latch up of first and second systems which are connected electrically to each other and which have a respective independent power supply is disclosed. At least one of the systems is a computer system. The method includes the steps of: providing a buffer unit having signal lines adapted to be connected electrically to the first and second systems to permit signal transmission between the first and second systems; and providing a buffer control unit connected electrically to the buffer unit and adapted to be connected electrically to the power supplies of the first and second systems. The buffer control unit is adapted to detect voltages of the power supplies of the first and second systems and disables the buffer unit so as to disconnect the first and second systems from each other when the voltage of the power supply of any one of the first and second systems is not within a predetermined range.

9 Claims, 5 Drawing Sheets

5,675,525

APPARATUS FOR PREVENTING LATCH UP OF TWO SYSTEMS WHICH ARE CONNECTED ELECTRICALLY TO EACH OTHER AND WHICH HAVE A RESPECTIVE INDEPENDENT POWER SUPPLY

This application originates from Taiwan patent application No. 83203313 filed Jun. 30, 1994. Said document is incorporated herein by reference.

BACKGROUND OF THE INVENTION

1. Field of the Invention

This invention relates to a method and apparatus for preventing latch up of two systems which are connected electrically to each other and which have a respective independent power supply.

2. Description of the Related Art

A general computer system or microprocessor is usually connected electrically to another system, such as a printer, a display unit, PCMCIA, . . . , etc. However, the general computer system is not provided with an apparatus for preventing latch up of the general computer system and the other system which have a respective independent power supply. Therefore, latch up of the general computer system and the other system may occur due to the occurrence of an input signal level that is higher than the power supply level when supply of voltage from the power supplies of the general computer system and the other system are not activated at the same time or when one of the general computer system and the other system is reset during operation.

SUMMARY OF THE INVENTION

Therefore, the objective of the present invention is to provide a method and apparatus for preventing latch up of two systems which are connected electrically to each other and which have a respective independent power supply.

According to one aspect of the present invention, a method is provided for preventing latch up of first and second systems which are connected electrically to each other and which have a respective independent power supply. At least one of the systems is a computer system. The method includes the steps of: providing a buffer unit having signal lines adapted to be connected electrically to the first and second systems to permit signal transmission between the first and second systems; and providing a buffer control unit connected electrically to the buffer unit and adapted to be connected electrically to the power supplies of the first and second systems. The buffer control unit is adapted to detect voltages of the power supplies of the first and second systems and disables the buffer unit so as to disconnect the first and second systems from each other when the voltage of the power supply of any one of the first and second systems is not within a predetermined range.

According to another aspect of the present invention, an apparatus is provided for preventing latch up of first and second systems which are connected electrically to each other and which have a respective independent power supply. At least one of the systems is a computer system. The apparatus includes: a buffer unit having signal lines adapted to be connected electrically to the first and second systems to permit signal transmission between the first and second systems; and a buffer control unit connected electrically to the buffer unit and adapted to be connected electrically to the power supplies of the first and second systems. The buffer control unit is adapted to detect voltages of the power supplies of the first and second systems and disables the buffer unit so as to disconnect the first and second systems from each other when the voltage of the power supply of any one of the first and second systems is not within a predetermined range.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
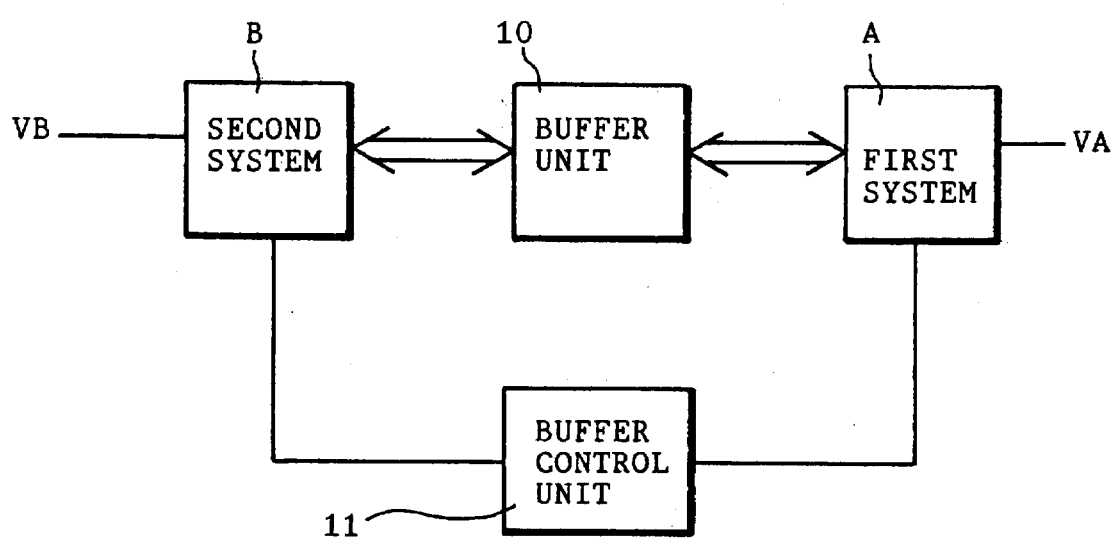
FIG. 1 is a schematic block diagram showing a first preferred embodiment of the present invention when the first preferred embodiment is used to connect electrically first and second systems that have a respective independent power supply.

Before the present invention is described in greater detail with reference to the accompanying drawings, it should be appreciated that like reference characters refer to like and corresponding parts throughout the specification.

Figure 2:
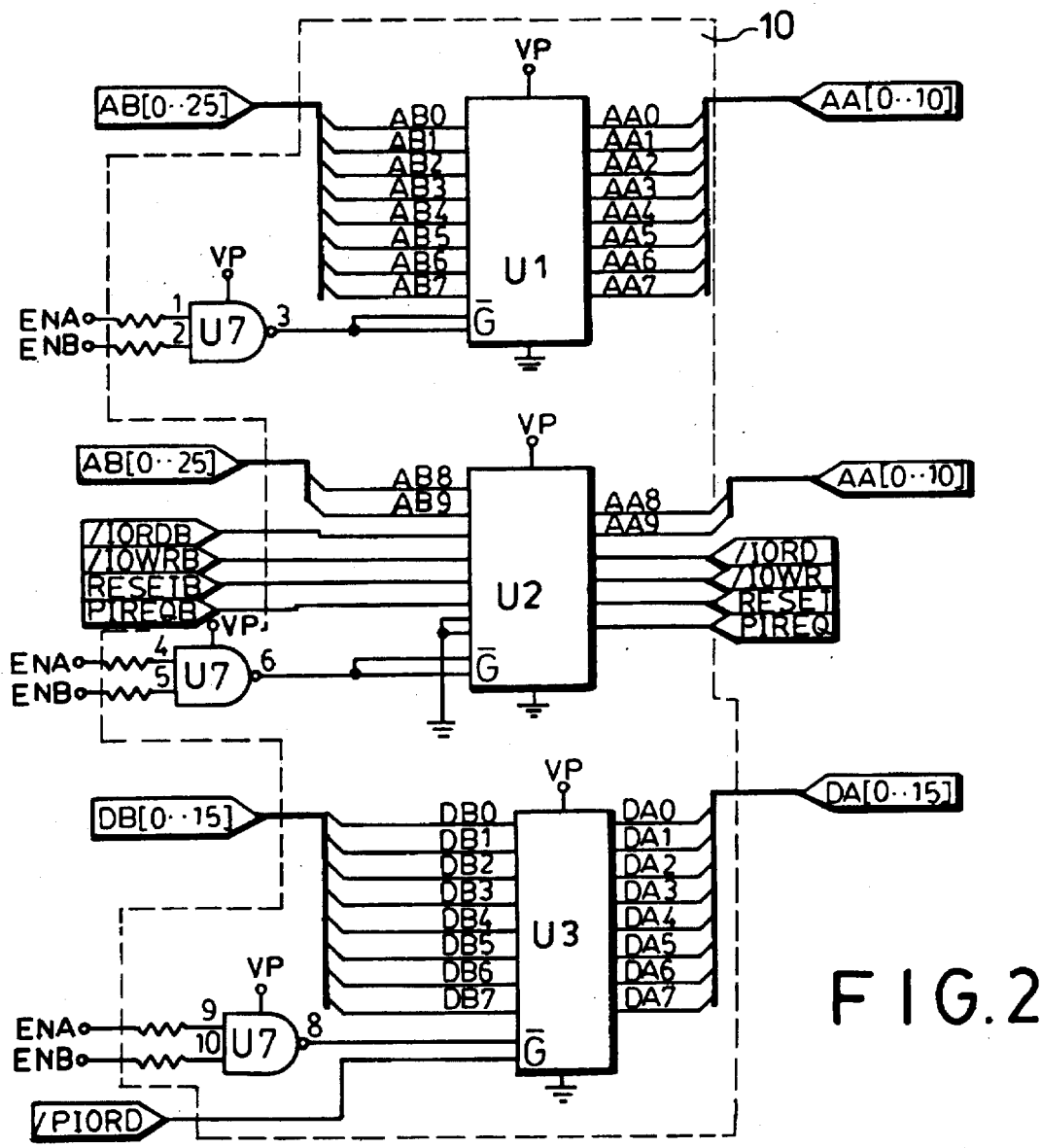
FIG. 2 is a schematic circuit diagram illustrating a buffer unit of the first preferred embodiment of the present invention.
Figure 3:
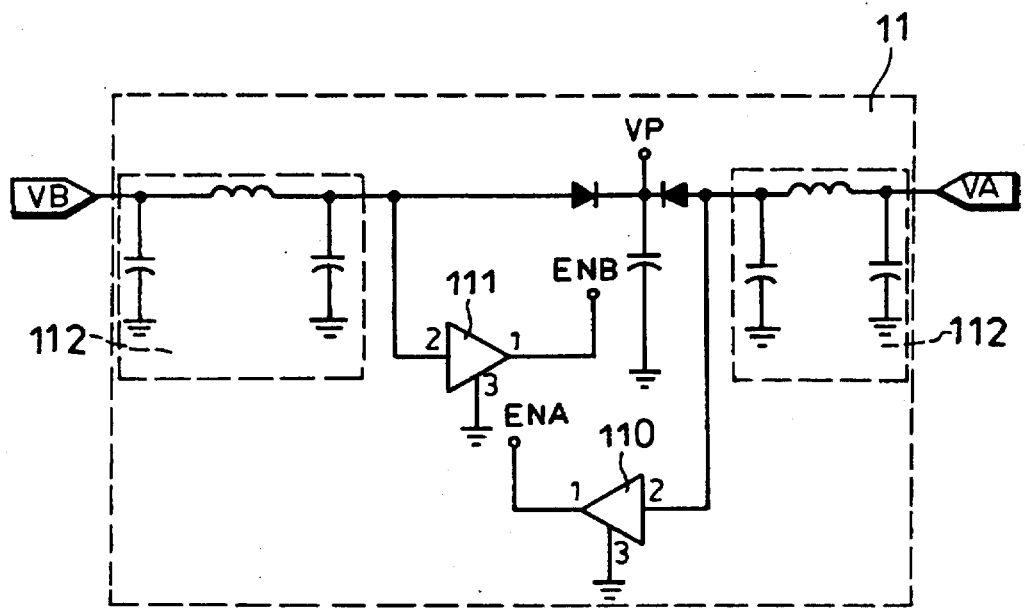
FIG. 3 is a schematic circuit diagram illustrating a buffer control unit of the first preferred embodiment of the present invention.

Referring to FIGS. 1, 2 and 3, a first embodiment of the present invention is shown to comprise a buffer unit 10 and a buffer control unit 11.

In the present embodiment, the buffer unit 10 includes three buffer circuits (U1,U2,U3) and three control gates (U7). Each of the buffer circuits (U1,U2,U3) has a disable input terminal, signal lines connected electrically to first and second systems (A and B) to permit signal transmission therebetween, and an operating Voltage input terminal (VP). It is noted that at least one of the first and second systems (A and B) is a computer system. The first and second systems (A and B) have a respective independent power supply (not shown). In the present embodiment, the voltages (VA and VB) of the power supplies of the first and second systems (A and B) are at the same level. Preferably, the signal lines of the buffer circuits (U1,U2,U3) include data signal lines, address signal lines and control signal lines. Each of the control gates (U7) has a first input terminal, a second input terminal, an output terminal connected electrically to the disable input terminal of a respective one of the buffer circuits (U1,U2,U3), and an operating voltage input terminal (VP).

The buffer control unit 11 includes a first filter circuit 112 which has an input connected electrically to the power supply of the first system (A), a first detecting circuit 110 which is connected electrically to an output of the first filter circuit 112 and which generates a first control signal (ENA) when the voltage (VA) of the power supply of the first system (A) is not within the predetermined range, a first current limiter 113 which has an input connected electrically to the output of the first filter circuit 112, a second filter circuit 112 which has an input connected electrically to the power supply of the second system (B), a second detecting circuit 111 which is connected electrically to an output of the second filter circuit 112 and which generates a second control signal (ENB) when the voltage (VB) of the power supply of the second system (B) is not within the predetermined range, and a second current limiter 113 which has an input connected electrically to the output of the second filter circuit 112 and an output connected electrically to an output of the first current limiter 113. The first and second current limiters 113 provide an operating voltage at the outputs thereof. The operating voltage input terminal of each of the buffer circuits (U1,U2,U3) and the control gates (U7) is connected electrically to the outputs of the first and second limiters 113 such that each of the buffer circuits (U1,U2,U3) and the control gates (U7) receives the operating voltage from the first and second current limiters 113. In the present embodiment, each of the first and second limiter 113 includes at least one diode, while each of the control gates (U7) is a NAND gate.

In operation, the first detecting circuit 110 detects and generates the first control signal (ENA) when the voltage (VA) of the power supply of the first system (A) is not within the predetermined range. The second detecting circuit 111 detects and generates the second control signal (ENB) when the voltage (VB) of the power supply of the second system (B) is not within the predetermined range. Each of the control gates (U7) generates a disable signal at the output terminal thereof so as to disable the corresponding buffer circuit (U1,U2,U3) upon reception of at least one of the first and second control signals (ENA and ENB) from the first and second detecting circuits, 110 and 111, thereby disconnecting the first and second systems (A and B) from each other to prevent latch up of the first and second systems (A and B).

Preferably, the predetermined range is from 0 to −5% of the normal voltage of the power supplies of the first and second systems (A and B). This range was selected because a typical semiconductor element has a tolerable supply voltage range of about ±5%.

Figure 4:
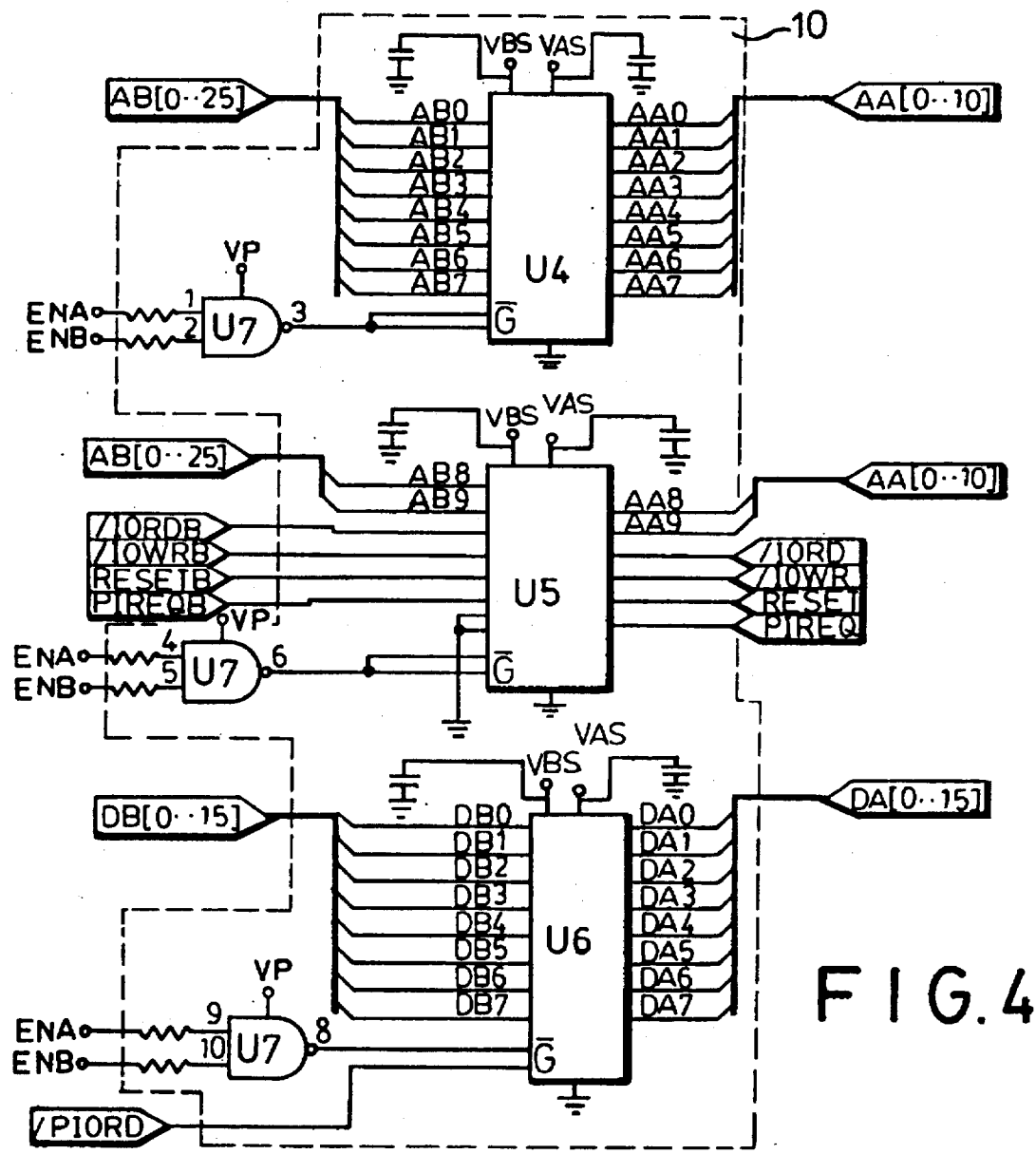
FIG. 4 is a schematic circuit diagram illustrating a buffer unit of a second preferred embodiment of the present invention.
Figure 5:
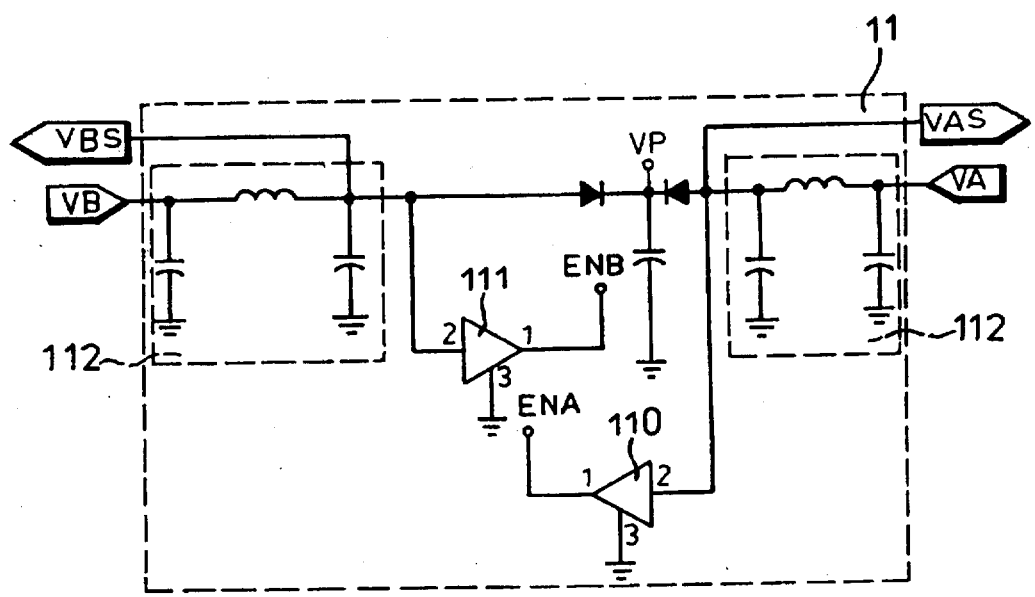
FIG. 5 is a schematic circuit diagram illustrating a buffer control unit of the second preferred embodiment of the present invention.

Referring now to FIGS. 4 and 5, a second embodiment of the present invention is shown. Unlike the first embodiment, the voltages of the power supplies of the first and second systems are at different levels. Each of the buffer circuits (U4,U5,U6) is a level shifting buffer circuit which has a first operating voltage input terminal (VAS) connected electrically to the output of the first filter circuit 112 to receive a first operating voltage therefrom, and a second operating voltage input terminal (VBS) connected electrically to the output of the second filter circuit 112 to receive a second operating voltage therefrom.

The filter circuits 112 can filter out the interference noise produced during switching of the logic circuits.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. An apparatus for preventing latch up of first and second systems which are connected electrically to each other and which have a respective independent power supply, at least one of the first and second systems being a computer system, said apparatus comprising;

a buffer unit having a signal lines adapted to be connected electrically to the first and second systems to permit signal transmission between the first and second systems; and a buffer control unit connected electrically to said buffer unit and adapted to be connected electrically to the power supplies of the first and second systems, said buffer control unit being adapted to detect voltages of the power supplies of the first and second systems and disabling said buffer unit so as to disconnect the first and second systems from each other when the voltage of the power supply of any one of the first and second systems is not within a predetermined range;

said buffer control unit includes a first detecting circuit for generating a first control signal when the voltage of the power supply of the first systems is not within the predetermined range, and a second detecting circuit for generating a second control signal when the voltage of the power supply of the second system is not within the predetermined range; and said buffer unit includes at least one buffer circuit having a disable input terminal, and at least one control gate having a first input terminal connected electrically to said first detecting circuit, a second input terminal connected electrically to said second detecting circuit, and an output terminal connected electrically to said disable input terminal of the buffer circuit, said control gate generating a disable signal at said output terminal thereof so as to disable said buffer circuit upon reception of at least one of said first and second control signals from said first and second detecting circuits.

2. An apparatus as claimed in claim 1, wherein said buffer control unit further includes a first filter circuit having an input adapted to be connected electrically to the power supply of the first system and an output connected electrically to said first detecting circuit, a first current limiter having an input connected electrically to said output of said first filter circuit and an output, a second filter circuit having an input adapted to be connected electrically to the power supply of the second system and an output connected electrically to said second detecting circuit, and a second current limiter having an input connected electrically to said output of said second filter circuit and an output connected electrically to said output of said first current limiter, said first and second current limiters providing an operating voltage at said outputs thereof.

3. An apparatus as claimed in claim 2, wherein said control gate has an operating voltage input terminal connected electrically to said outputs of said first and second current limiters for receiving said operating voltage therefrom.

4. An apparatus as claimed in claim 2, wherein said buffer circuit has an operating voltage input terminal connected electrically to said outputs of said first and second current limiters for receiving said operating voltage therefrom.

5. An apparatus as claimed in claim 2, wherein each of said first and second current limiters includes at least one diode.

6. An apparatus as claimed in claim 5, wherein said buffer circuit is a level shifting buffer circuit having a first operating voltage input terminal connected electrically to said output of said first filter circuit for receiving a first operating voltage therefrom, and a second operating voltage input terminal connected electrically to said output of said second filter circuit for receiving a second operating voltage therefrom.

7. An apparatus as claimed in claim 2, wherein the voltages of the power supplies of the first and second systems are at different levels.

8. An apparatus as claimed in claim 1, wherein said control gate is a NAND gate.

9. An apparatus as claimed in claim 1, wherein the predetermined range is from 0 to −5% of normal voltages of the power supplies of the first and second systems.

* * * * *